United States Patent
Panje

(10) Patent No.: US 10,863,403 B2
(45) Date of Patent: Dec. 8, 2020

(54) SYSTEM AND METHOD FOR ENHANCED CLIENT ROAMING

(71) Applicant: ARRIS Enterprises LLC, Suwanee, GA (US)

(72) Inventor: Krishna Prasad Panje, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/678,900

(22) Filed: Aug. 16, 2017

(65) Prior Publication Data

US 2019/0059033 A1   Feb. 21, 2019

(51) Int. Cl.
| | |
|---|---|
| H04W 4/00 | (2018.01) |
| H04W 36/18 | (2009.01) |
| H04W 36/00 | (2009.01) |
| H04W 28/18 | (2009.01) |
| H04W 84/12 | (2009.01) |
| H04W 36/30 | (2009.01) |
| H04W 48/16 | (2009.01) |
| H04W 48/20 | (2009.01) |

(52) U.S. Cl.
CPC ........... *H04W 36/18* (2013.01); *H04W 28/18* (2013.01); *H04W 36/0061* (2013.01); *H04W 36/00835* (2018.08); *H04W 36/30* (2013.01); *H04W 48/16* (2013.01); *H04W 48/20* (2013.01); *H04W 84/12* (2013.01)

(58) Field of Classification Search
CPC ..... H04W 36/18; H04W 48/20; H04W 28/18; H04W 48/16; H04W 36/30
See application file for complete search history.

(56) References Cited

U.S. PATENT DOCUMENTS

| | | |
|---|---|---|
| 2006/0052106 A1 | 3/2006 | Park |
| 2008/0123607 A1* | 5/2008 | Jokela .................. H04L 47/15 370/338 |
| 2009/0061799 A1* | 3/2009 | Park .................. H04W 52/0258 455/127.5 |
| 2010/0241854 A1 | 9/2010 | Yao |

(Continued)

OTHER PUBLICATIONS

PCT International Search Report & Written Opinion, Re: Application No. PCT/US2018/000206, dated Oct. 12, 2018.

(Continued)

*Primary Examiner* — Clemence S Han
(74) *Attorney, Agent, or Firm* — Wenderoth, Lind & Ponack, L.L.P.

(57) ABSTRACT

An access point is provided for use with a neighboring access point and a client. The access point includes: a receiving component that receives a neighbor report request; a transmitting component that transmits a second neighbor report request and a soft resource request to the neighboring access point; and a report generating component that generates a neighbor report. The receiving component also receives resource response data of the neighboring access point associated with the second neighbor report request and receives soft resource response data of the neighboring access point associated with the soft resource request. The report generating component generates the neighbor report based on the resource response data and the soft resource response data of the neighboring access point. The transmitting component transmits the neighbor report to the client.

12 Claims, 8 Drawing Sheets

(56) References Cited

U.S. PATENT DOCUMENTS

| | | | | |
|---|---|---|---|---|
| 2011/0130149 A1* | 6/2011 | Yao | .................. | H04W 48/12 |
| | | | | 455/453 |
| 2011/0205910 A1* | 8/2011 | Soomro | ............... | H04W 48/20 |
| | | | | 370/252 |
| 2013/0070739 A1 | 3/2013 | McCann et al. | | |
| 2016/0366637 A1* | 12/2016 | Barriac | ................ | H04W 48/16 |
| 2017/0135019 A1* | 5/2017 | Vamaraju | .............. | H04W 36/30 |
| 2017/0280337 A1* | 9/2017 | Bahr | ..................... | H04W 48/20 |

OTHER PUBLICATIONS

G. Venkatesan:, "TGV Internal Review Comment Resolution GV; 11-07-0093-00-000V-tgv-internal-review-comment-resolution-gv", IEEE draft, vol. 802.11v, Jan. 15, 2007, pp. 1-3.

IEEE Standard for Information Technology—Local and metropolitan Area Networks—Specitic Requirements—Part 11: Wireless LAN Medium Access Control (MAC) and Physical Layer (PHY) Specification Amendment 1: Radio Resource Measurement of Wireless LANs; IEEE Std. 802.11k-2008.

Office Action dated Aug. 6, 2020 in AU Patent Application No. 2018318693.

\* cited by examiner

| PREFERENCE FIELD VALUE | DESCRIPTION |
|---|---|
| 0 | EXCLUDED BSS: RESERVED WHEN PRESENT IN THE BSS TRANSITION MANAGEMENT QUERY OR BSS TRANSITION MANAGEMENT RESPONSE FRAMES. |
| 1-255 | RELATIVE VALUES USED TO INDICATE THE PREFERRED ORDERING OF BSSs, WITH 255 INDICATING THE MOST PREFERRED CANDIDATE AND 1 INDICATING THE LEAST PREFERRED CANDIDATE. |

*FIG. 5A*

| ELEMENT ID | LENGTH | AP AVERAGE ACCESS DELAY |
|---|---|---|
| 1 | 1 | 1 |

OCTETS:

*FIG. 5B*

SYSTEM AND METHOD FOR ENHANCED CLIENT ROAMING

BACKGROUND

Embodiments of the invention relate to devices and methods to enhance client roaming in a wireless network.

In a wireless network, a static client may have a choice of connecting with several access points, or a moving client may need to hand off and connect to new access points as the client physically changes position. Prior art methods prioritize access point candidates by physical aspects such as noise and power, but do not capture other parameters that may also affect the candidate list.

There exists a need for a system and method for enhancing client roaming in a wireless network.

SUMMARY

Aspects of the present invention are drawn to an access point for use with a neighboring access point and a client. The access point includes: a receiving component that receives a neighbor report request; a transmitting component that transmits a second neighbor report request and a soft resource request to the neighboring access point; and a report generating component that generates a neighbor report. The receiving component also receives resource response data of the neighboring access point associated with the second neighbor report request and receives soft resource response data of the neighboring access point associated with the soft resource request. The report generating component generates the neighbor report based on the resource response data and the soft resource response data of the neighboring access point. The transmitting component transmits the neighbor report to the client.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 5A illustrates a preference field structure in accordance with aspects of the present invention; and FIG. 5B illustrates an access delay structure in accordance with aspects of the present invention.

DETAILED DESCRIPTION

The present invention provides for an access point for use with a neighboring access point and client that enhances client roaming in a wireless network.

Wireless networks are common in today's world. These networks can be quite large and can comprise multiple access points and clients. Clients may be static or may be moving about. Individual access points experience varying loads that depend on network traffic, the number of clients connected to an access point, radio frequency noise, and other factors.

Many wireless networks are based on the Wi-Fi standard, in which a client normally connects to an access point that provides the strongest signal. If this access point is loaded to its fullest capacity, the client may be blocked. The 802.11k protocol improves the distribution of traffic within such situations. If a network that conforms to 802.11k, a client may connect to an underutilized access point even if that access point provides a weaker signal. The overall throughput of the network is improved because the network resources are used more efficiently.

802.11k allows any device, either client or access point, to request information from another device in the wireless network. The other device responds with information that includes channel load, noise statistics, link measurement, and neighbor report. 802.11k facilitates client roaming in a wireless network, but these prior art methods are limited to parameters such as Wi-Fi load, location, and signal strength. A problem arises when an access point may appear to be available, but may have other constraints; for example, an access point may be scheduled to serve a high-priority video stream. The client has no information about the pending resource constraint and will be blocked if it attempts to connect with this access point. The present invention captures information about soft resources such as CPU load, number of decryptors, and authorization limits, and allows clients to determine connectivity based on both physical and soft resource constraints.

Aspects of the present invention will now be described with reference to FIGS. 1-5B.

Figure 1:
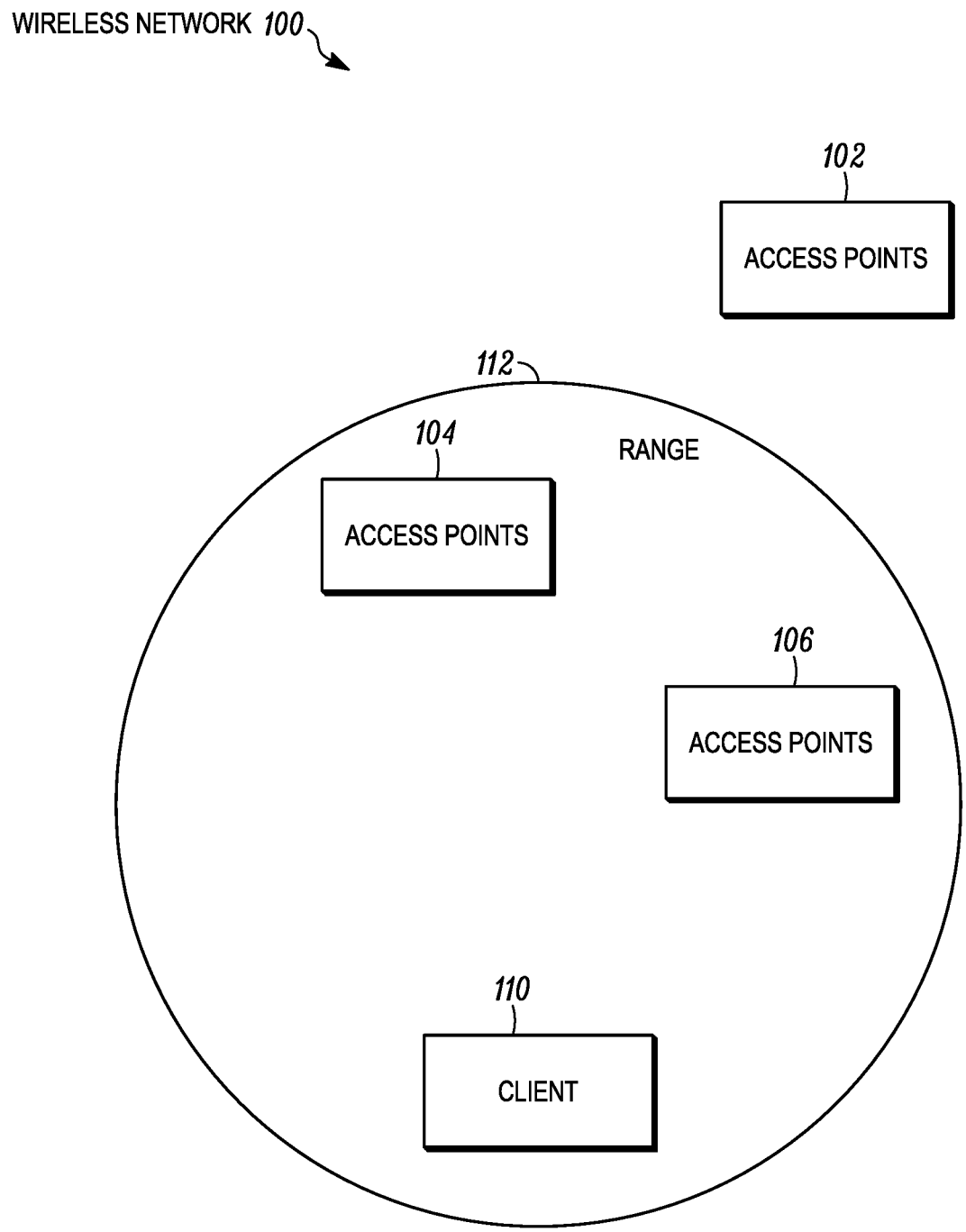
FIG. 1 illustrates a wireless network with a client and access points.

FIG. 1 illustrates wireless network 100.

As shown in the figure, wireless network 100 includes a client 110, an access point 102, an access point 104, and an access point 106. In this non-limiting example, one client is shown for purposes of explanation. It should be noted that in other example embodiments, wireless network 100 may contain multiple clients.

Client 110 is within range 112 of access points 104 and 106. Access point 102 is out of range 112; that is, access point 102 is too far away from client 110 to support a reliable connection.

Client 110 is any device that connects to wireless network 100 in order to use computing or storage resources within or connected to wireless network 100. Non-limiting examples of client 110 are smartphones, tablets, or personal computers.

Access points 102-106 are any device that allow client 110 to connect to wireless network 100. Non-limiting examples of access points 102-106 are routers or set-top boxes. In this non-limiting example, access points 102-106 and client 110 are separate devices; in other example embodiments, client and access point may be the same device.

Components of client 110 and access points 102-106 will now be discussed with additional reference to FIG. 2.

Figure 2:
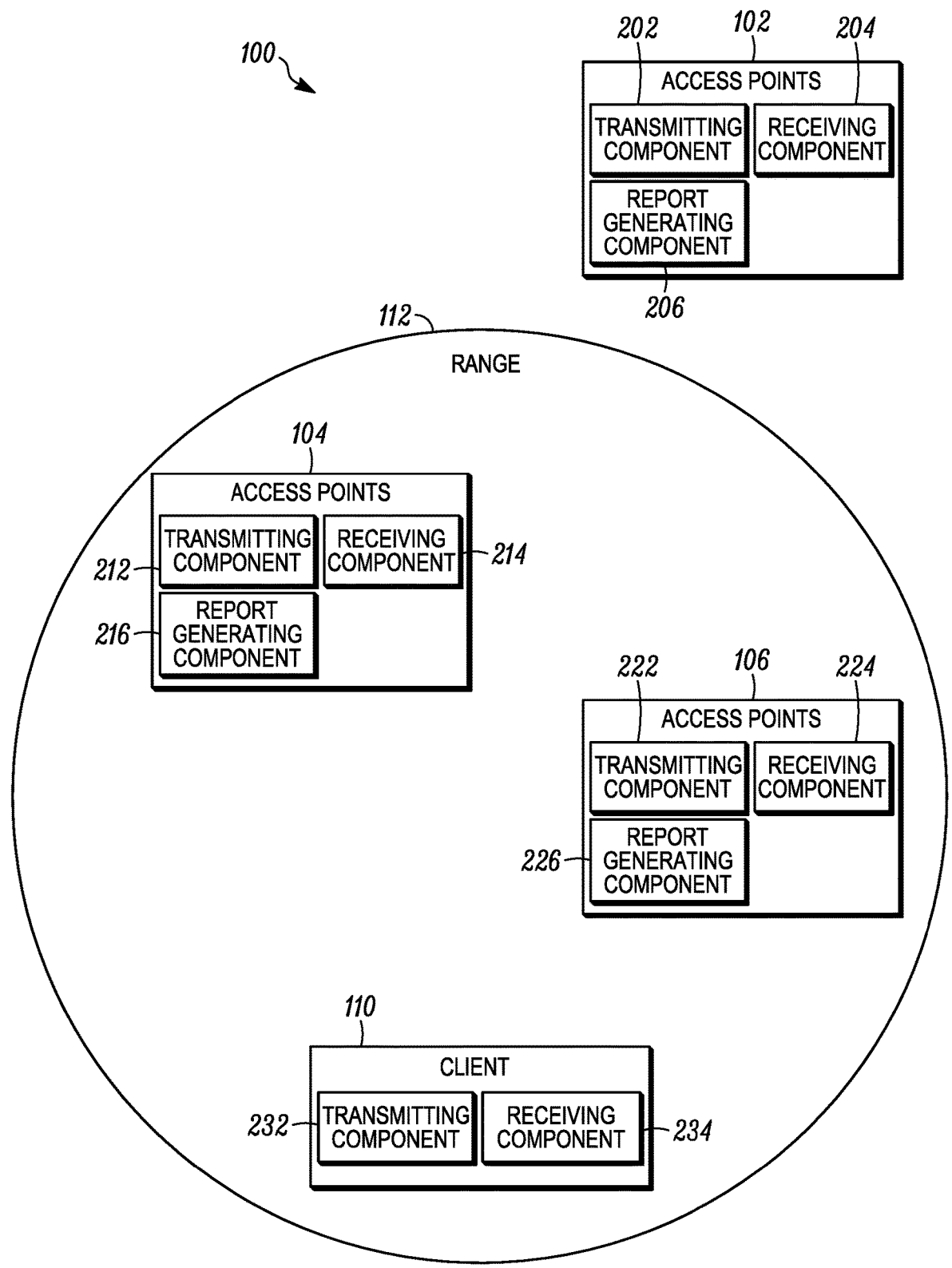
FIG. 2 illustrates components of a client and access points.

FIG. 2 illustrates components of client 110 and access points 102 and 106.

As shown in the figure, client 110 contains transmitting component 232 and receiving component 234.

Transmitting component 232 is any system or device for sending requests or data to an access point or another client.

Receiving component 234 is any system or device for receiving requests or data from an access point or another client.

In this non-limiting example, transmitting component 232 and receiving component 234 are shown as separate components. In other example embodiments, transmitting component 232 and receiving component 234 may be combined as a unitary device. Further, in some embodiments, at least one of transmitting component 232 and receiving component 234 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, SD cards, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

As shown in the figure, access points 102, 104 and 106 contain transmitting components 202, 212 and 222, respectively; receiving components 204, 214 and 224, respectively; and report generating components 206, 216 and 226, respectively.

Transmitting components 202, 212 and 222 are any system or device for sending requests or data to another access point or a client.

Receiving components 204, 214 and 224 are any system or device for receiving requests or data from another access point or a client.

Report generating components 206, 216 and 226 are any system or device for generating a neighbor report based on the resource response data and the soft resource response data of the neighboring access point.

Resource response data are measurements and information described by 802.11k. Soft resource response data is data associated with one of the group consisting of current processing load of neighboring access point, additional number of clients the neighboring access point can accept, impending resource constraints, data throughput to the Internet, currently named clients, and combinations thereof.

In this non-limiting example, transmitting component 202, receiving component 204, and report generating component 206 are shown as separate components. In other example embodiments, they may be combined as a unitary device. Further, in some embodiments, at least one of transmitting component 202, receiving component 204, and report generating component 206 may be implemented as a computer having tangible computer-readable media for carrying or having computer-executable instructions or data structures stored thereon.

An example method 300 of enhancing roaming in accordance with aspects of the present invention will now be described with additional reference to FIGS. 3-5B.

Figure 3:
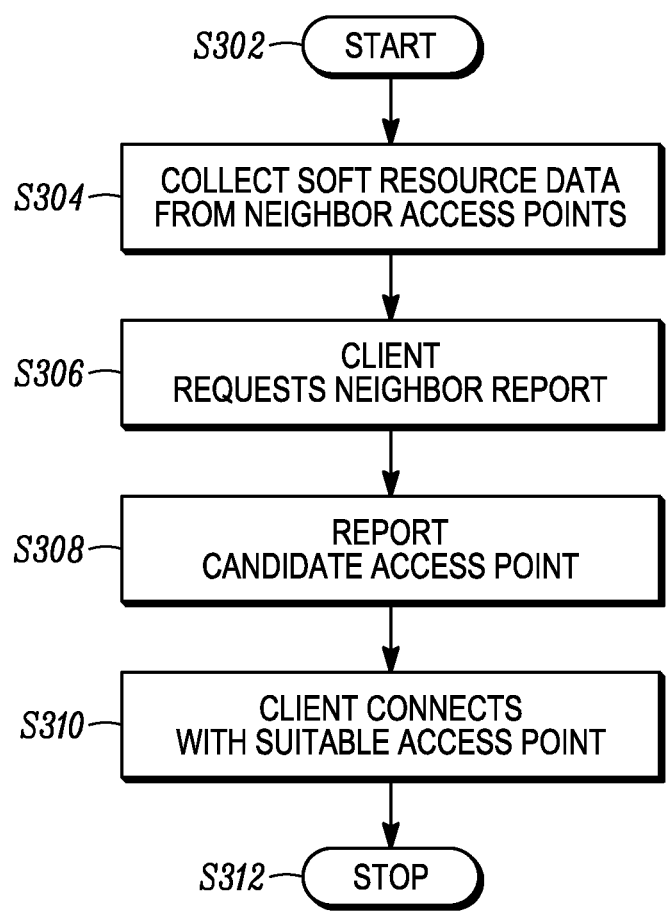
FIG. 3 illustrates a method for enhancing client roaming in accordance with aspects of the present invention.

FIG. 3 illustrates method 300 of enhancing client roaming in wireless network 100 in accordance with aspects of the present invention.

As shown in the figure, method 300 starts (S302), and soft resource data is collected from neighboring access points (S304).

Figure 4A:
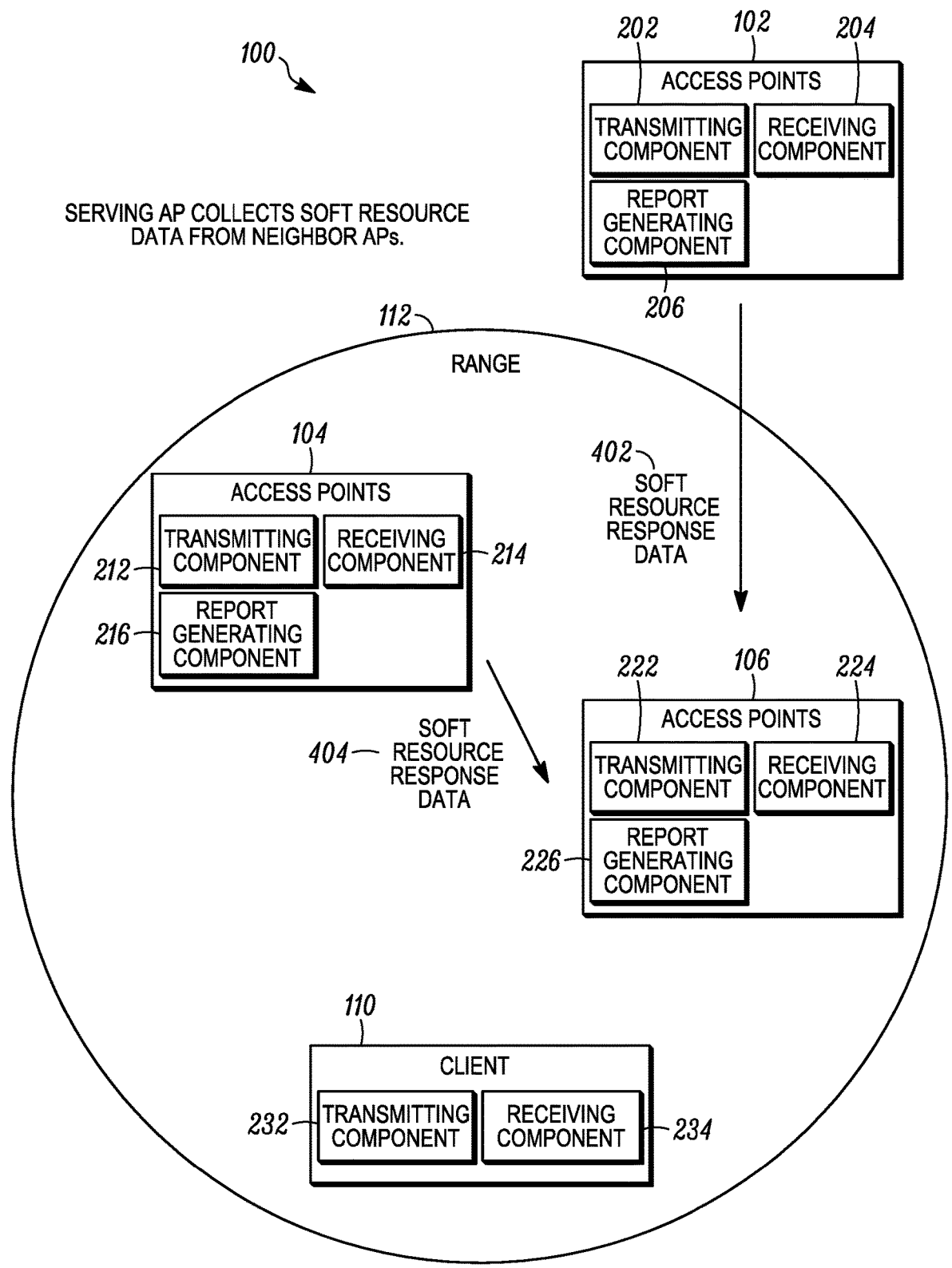
FIG. 4A illustrates a flow of soft resource data in accordance with aspects of the present invention.

FIG. 4A illustrates the flow of soft resource response data 402 and 404 between access points 102-106 in accordance with aspects of the present invention.

As shown in the figure, access points 102 and 104 send soft resource response data 402 and 404, respectively, to access point 106.

In one example embodiment, access point 102 transmits soft resource response data 402 at regular time intervals to be received by access points 104 and 106. Access point 104 transmits soft resource response data 404 at regular time intervals to be received by access points 102 and 106. Access point 106 therefore receives regular updates about the soft resources in access points 102 and 104.

In another example embodiment, access point 106 requests soft resource response data 402 and 404 from access points 102 and 104 as needed. Access point 106 may make the soft resource response data request when it detects that its own soft resources are being constrained.

Returning to FIG. 3, after soft resource response data is collected from neighboring access points (S304), the client requests a neighbor report (S306). For example, as shown in FIG. 4B, client 110 transmits neighbor report request 406 to access point 106.

Figure 4B:
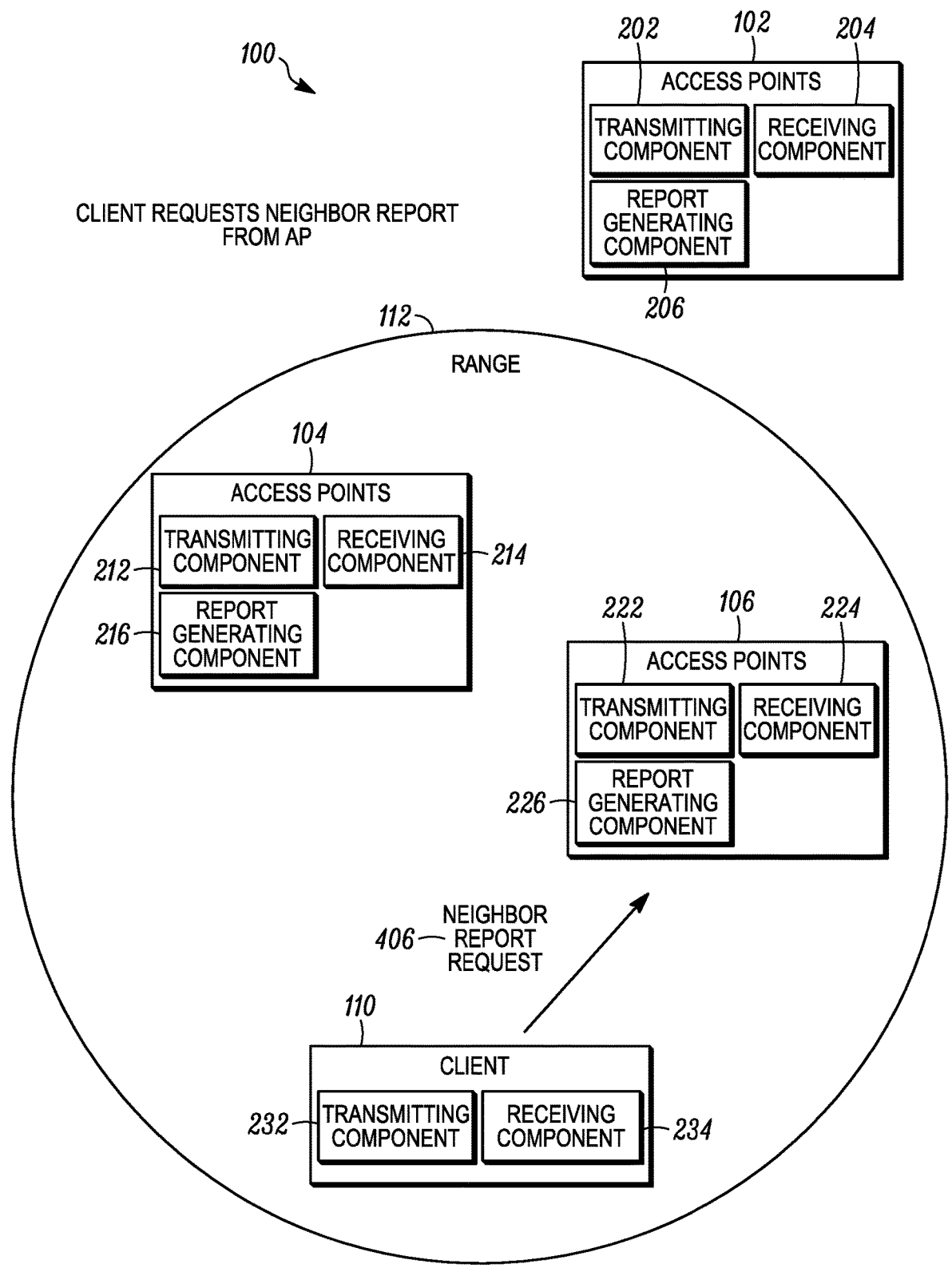
FIG. 4B illustrates a neighbor report request in accordance with aspects of the present invention.

FIG. 4B illustrates the transmission of neighbor report request 406 in accordance with aspects of the present invention.

As shown in the figure, client 110 is trying to determine the best access point with which to connect. Client 110 attempts to gain more knowledge about available resources of wireless network 100 by querying access point 106 for information about neighboring access points. This is accomplished by the transmission of neighbor report request 406 from transmitting component 232 to receiving component 224.

Returning to FIG. 3, after the client requests a neighbor report (S306), the candidate access points are reported (S308). For example, as shown in FIG. 4C, access point 106 signals candidate access points to client 110.

Figure 4C:
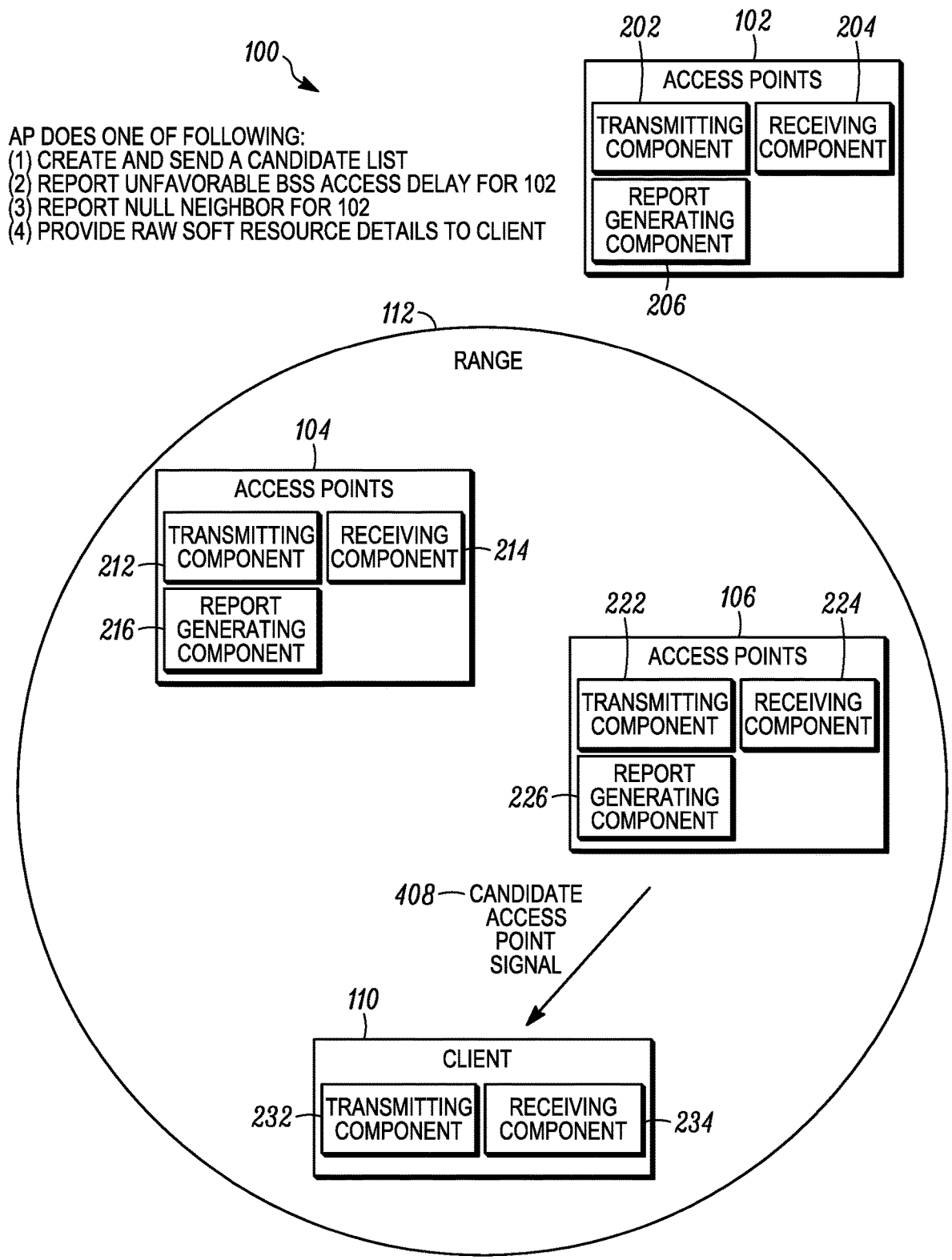
FIG. 4C illustrates a transmission of a candidate access point signal in accordance with aspects of the present invention.

FIG. 4C illustrates the signaling of candidate access points in accordance with aspects of the present invention.

As shown in the figure, access point 106 informs client 110 which access points in wireless network 100 are available to connect with by sending candidate access point signal 408 from transmitting component 222 to receiving component 234.

In one example embodiment, access point 106 uses soft resource response data 402 and 404 to create a candidate list that ranks access points 102 and 104 according to their soft resource utilization. Ranking may be signaled by transmitting data illustrated by FIG. 5A.

FIG. 5A illustrates preference field structure 500 in accordance with aspects of the present invention.

As shown in the figure, preference field structure 500 has preference field value 502 that can range in value from 0 to 255. A value of 255 indicates the most preferred access point candidate and a value of 1 indicates the least preferred access point candidate.

Returning to FIG. 4C, report generating component 226 generates list of access point candidates with each candidate assigned a preference field value 502. Transmitting component 222 transmits this list, as a component of candidate access point signal 408, which is received by receiving component 234.

In another example embodiment, access point 106 uses soft resource response data 402 and 404 to determine whether or not a particular neighboring access point is available. Access point 106 then signals availability by transmitting data illustrated by FIG. 5B.

FIG. 5B illustrates access delay structure 504 in accordance with aspects of the present invention.

As shown in the figure, access delay structure 504 contains AP average access delay field 506 that can range in value from 0 to 255. A value of 0 indicates minimal access delay and a value above 250 indicates a considerably long delay.

Returning to FIG. 4C, access point 106 may be preparing to serve a high-priority video stream. Access point 106 signals its unavailability to client 110 by transmitting access delay structure 504 with AP average access delay field 506 value above 250.

In another example embodiment, access point 106 may signal its pending unavailability by transmitting a Null neighbor report.

Referring to FIG. 4B, client 110 is attempting to discover which access points in wireless network 100 are available. Access point 102 is out of range 112, and is therefore not a candidate. Client 110 transmits neighbor report request 406 to the nearest access point, which is access point 106.

Referring to FIG. 4C, access point 106 is preparing to serve a high-priority video stream. Report generating component 226 creates a Null neighbor report to signal that access point 106 is about to become unavailable. Transmitting component 222 sends the Null neighbor report, as a component of candidate access point signal 408, which is received by receiving component 234.

In another example embodiment, access point 106 provides unprocessed soft resource response data from all access points in wireless network 100 to client 110. Client 110 evaluates the unprocessed soft response data to decide on its preferred access point, without any analysis by access point 106.

Referring to FIG. 4A, access point 106 collects soft resource response data 402 and 404 from access points 102 and 104, respectively. Access point 106 can transmit its own soft resource response data and soft resource response data 402 and 404 directly to client 110 as components of candidate access point signal 408, as shown in FIG. 4C. Client 110 can then perform the analysis to decide which access point to connect with in wireless network 100.

Returning to FIG. 3, after candidate access points are reported (S308), the client connects with a suitable access point (S310). For example, as shown in FIG. 4D, client 110 connects to access point 104.

Figure 4D:
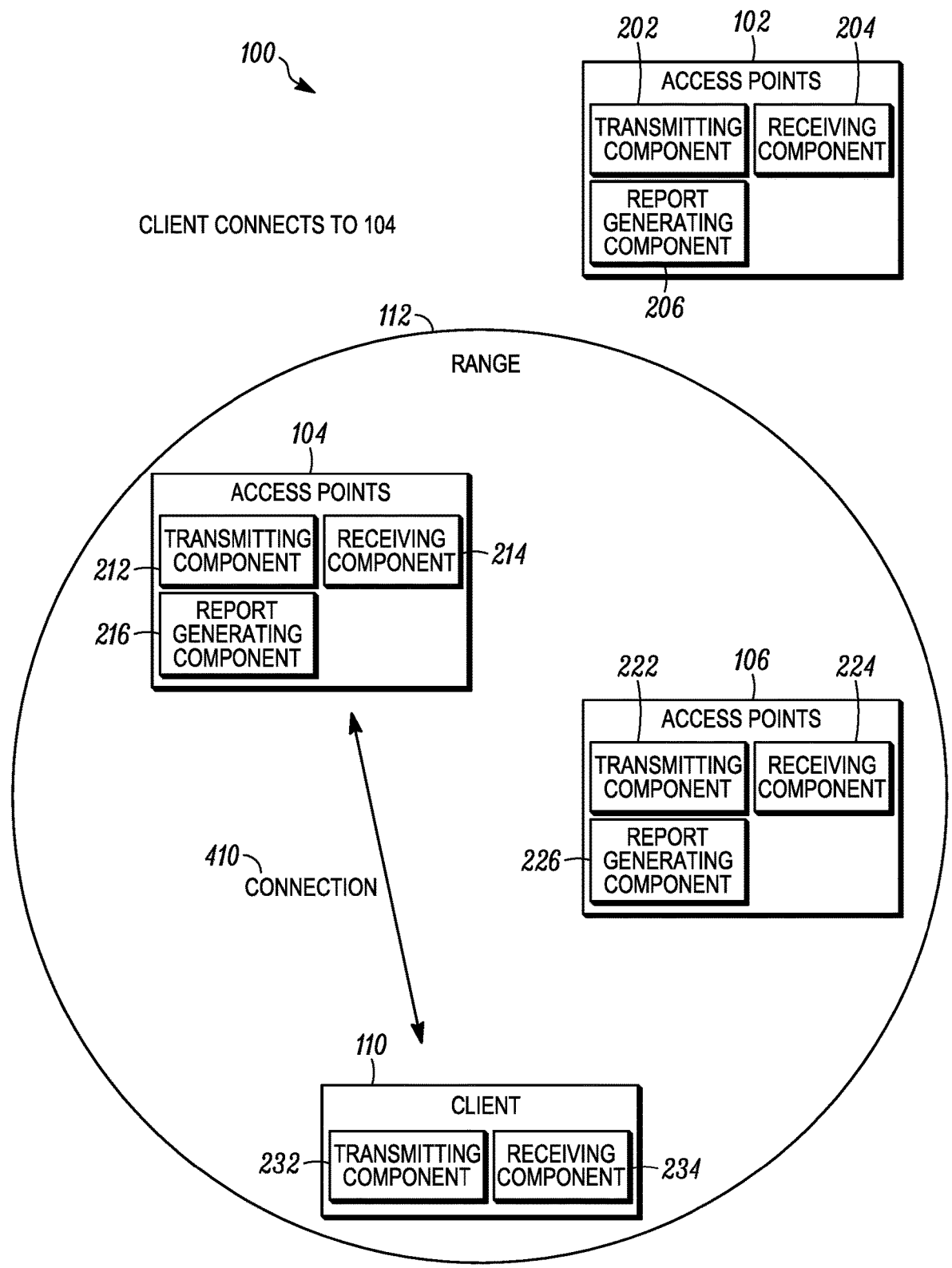
FIG. 4D illustrates a connection between client and access point in accordance with aspects of the present invention.

FIG. 4D illustrates connection 410 being established between client 110 and access point 104.

Referring to FIG. 4C, access point 106 signals that access point 104 is preferable over access point 106 by transmitting candidate access point signal 408. Returning to FIG. 4D, client 110 uses the information in candidate access point signal 408 to establish connection 410 with access point 104.

Returning to FIG. 3, after the client connects with the suitable access point (S310), method 300 stops (S312).

In summary, wireless networks must be able to optimize traffic among its access points and to connect clients that may be roaming from one location to another. Prior art systems report the availability of access points based on measurements such as channel load and noise. A problem arises when an access point may appear to be available, but may have other constraints; for example, an access point may be scheduled to serve a high-priority video stream. The client has no information about the pending resource constraint and will be blocked if it attempts to connect with this access point.

The present invention captures information about soft resources such as CPU load, number of decryptors, and authorization limits, and allows clients to determine connectivity based on both physical and soft resource constraints. Soft resource data is captured and used by access points or clients to determine which access points have the least resource constraints.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. An access point for use with one or more neighboring access points and a client, said access point comprising:
    a receiving component operable to receive a first neighbor report request from the client;
    a transmitting component operable to transmit a second neighbor report request to the one or more neighboring access points and to transmit a soft resource request to the one or more neighboring access points; and
    a report generating component operable to generate a neighbor report;
    wherein said receiving component is further operable to receive resource response data of the one or more neighboring access points associated with the second neighbor report request and to receive soft resource response data of the one or more neighboring access points associated with the soft resource request,
    wherein said report generating component is operable to generate the neighbor report based on (i) the resource response data of the one or more neighboring access points, (ii) the soft resource response data of the one or more neighboring access points, (iii) resource response data of said access point, and (iv) soft resource response data of said access point, such that the neighbor report includes at least one of
        a candidate list indicating a ranking or preference of each of said access point and the one or more neighboring access points according to soft resource utilization,
        a modified access delay signaling that at least one of said access point or the one or more neighboring access points has an unfavorable access delay, and
        a null report signaling that at least one of said access point or the one or more neighboring access points is about to become unavailable due to pending soft resource constraints, and
    wherein said transmitting component is further operable to transmit the neighbor report to the client.

2. The access point of claim 1, wherein the soft resource response data includes data related to one or more of the group consisting of current processing load of the one or more neighboring access points, additional number of clients the one or more neighboring access points can accept, impending resource constraints, data throughput to the Internet, currently named clients, and combinations thereof.

3. The access point of claim 2, further comprising:
a resource data generator operable to generate the resource response data of said access point associated with the first neighbor report request and to generate the soft resource response data of said access point associated with the first neighbor report request.

4. The access point of claim 1, further comprising:
a resource data generator operable to generate the resource response data of said access point associated with the first neighbor report request and to generate the soft resource response data of said access point associated with the first neighbor report request.

5. A method of managing client roaming between an access point and one or more neighboring access points, said method comprising:
receiving, via a receiving component of the access point, a first neighbor report request from the client;
transmitting, via a transmitting component of the access point, a second neighbor report request to the one or more neighboring access points;
transmitting, via the transmitting component of the access point, a soft resource request to the one or more neighboring access points;
generating, via a report generating component of the access point, a neighbor report;
receiving, via the receiving component of the access point, resource response data of the one or more neighboring access points associated with the second neighbor report request;
receiving, via the receiving component of the access point, soft resource response data of the one or more neighboring access points associated with the soft resource request; and
transmitting, via the transmitting component of the access point, the neighbor report to the client,
wherein said generating, via the report generating component of the access point, the neighbor report comprises generating the neighbor report based on (i) the resource response data of the one or more neighboring access points, (ii) the soft resource response data of the one or more neighboring access points, (iii) resource response data of said access point, and (iv) soft resource response data of said access point, such that the neighbor report includes at least one of
a candidate list indicating a ranking or preference of each of said access point and the one or more neighboring access points according to soft resource utilization,
a modified access delay signaling that at least one of said access point or the one or more neighboring access points has an unfavorable access delay, and
a null report signaling that at least one of said access point or the one or more neighboring access points is about to become unavailable due to pending soft resource constraints.

6. The method of claim 5, wherein the soft resource response data includes data related to one or more of the group consisting of current processing load of the one or more neighboring access points, additional number of clients the one or more neighboring access points can accept, impending resource constraints, data throughput to the Internet, currently named clients, and combinations thereof.

7. The method of claim 6, further comprising:
generating, via a resource data generator of the access point, the resource response data of the access point associated with the first neighbor report request; and
generating, via the resource data generator of the access point, the soft resource response data of the access point associated with the first neighbor report request.

8. The method of claim 5, further comprising:
generating, via a resource data generator of the access point, the resource response data of the access point associated with the first neighbor report request; and
generating, via the resource data generator of the access point, the soft resource response data of the access point associated with the first neighbor report request.

9. A non-transitory, tangible, computer-readable media having computer-readable instructions stored thereon, the computer-readable instructions being capable of being read by a computer access point and being capable of instructing a processor of the computer access point to perform a method of managing client roaming between the computer access point and one or more neighboring access point comprising:
receiving, via a receiving component of the computer access point, a first neighbor report request from the client;
transmitting, via a transmitting component of the computer access point, a second neighbor report request to the one or more neighboring access points;
transmitting, via the transmitting component of the computer access point, a soft resource request to the one or more neighboring access points;
generating, via a report generating component of the computer access point, a neighbor report;
receiving, via the receiving component of the computer access point, resource response data of the one or more neighboring access points associated with the second neighbor report request;
receiving, via the receiving component of the computer access point, soft resource response data of the one or more neighboring access points associated with the soft resource request; and
transmitting, via the transmitting component of the computer access point, the neighbor report to the client,
wherein said generating, via the report generating component of the computer access point, the neighbor report comprises generating the neighbor report based on (i) the resource response data of the one or more neighboring access points, and (ii) the soft resource response data of the one or more neighboring access points, (iii) resource response data of said computer access point, and (iv) soft resource response data of said computer access point, such that the neighbor report includes at least one of
a candidate list indicating a ranking or preference of each of said computer access point and the one or more neighboring access points according to soft resource utilization,
a modified access delay signaling that at least one of said computer access point or the one or more neighboring access points has an unfavorable access delay, and
a null report signaling that at least one of said computer access point or the one or more neighboring access points is about to become unavailable due to pending soft resource constraints.

10. The computer-readable media of claim 9, wherein the soft resource response data includes data related to one or more of the group consisting of current processing load of the one or more neighboring access points, additional number of clients the one or more neighboring access points can accept, impending resource constraints, data throughput to the Internet, currently named clients, and combinations thereof.

11. The computer-readable media of claim 10, the computer-readable instructions being capable of instructing the processor of the computer access point to perform the method further comprising:

generating, via a resource data generator of the computer access point, the resource response data of the computer access point associated with the first neighbor report request; and generating, via the resource data generator of the computer access point, the soft resource response data of the computer access point associated with the first neighbor report request.

12. The computer-readable media of claim 9, the computer-readable instructions being capable of instructing the processor of the computer access point to perform the method further comprising:

generating, via a resource data generator of the computer access point, the resource response data of the computer access point associated with the first neighbor report request; and generating, via the resource data generator of the computer access point, the soft resource response data of the computer access point associated with the first neighbor report request.

\* \* \* \* \*